(12) United States Patent
Bajer

(10) Patent No.: US 11,696,573 B2
(45) Date of Patent: *Jul. 11, 2023

(54) FISHING DEVICES AND METHODS

(71) Applicant: Carp Solutions, LLC, New Brighton, MN (US)

(72) Inventor: Przemyslaw G. Bajer, New Brighton, MN (US)

(73) Assignee: Carp Solutions, LLC, New Brighton, MN (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/163,507

(22) Filed: Jan. 31, 2021

(65) Prior Publication Data

US 2021/0144979 A1 May 20, 2021

Related U.S. Application Data

(63) Continuation of application No. 16/250,231, filed on Jan. 17, 2019, now Pat. No. 10,959,416.

(60) Provisional application No. 62/725,988, filed on Aug. 31, 2018.

(51) Int. Cl.
| | |
|---|---|
| *A01K 69/04* | (2006.01) |
| *A01K 75/00* | (2006.01) |
| *A01K 71/00* | (2006.01) |
| *A01K 74/00* | (2006.01) |

(52) U.S. Cl.
CPC ............. *A01K 69/04* (2013.01); *A01K 71/00* (2013.01); *A01K 74/00* (2013.01); *A01K 75/00* (2013.01)

(58) Field of Classification Search
CPC ........ A01K 69/04; A01K 75/00; A01K 71/00; A01K 73/04; A01K 73/045; A01K 74/00
See application file for complete search history.

(56) References Cited

U.S. PATENT DOCUMENTS

| | | | | |
|---|---|---|---|---|
| 1,640,990 | A * | 8/1927 | Hinton ................... | A01K 74/00 43/100 |
| 3,905,143 | A * | 9/1975 | Poirot .................... | A01K 69/00 43/14 |
| 4,086,874 | A * | 5/1978 | Sterner .................. | A01K 61/60 119/223 |
| 4,429,659 | A * | 2/1984 | Holyoak ................ | A01K 69/08 43/103 |
| 5,509,227 | A * | 4/1996 | Marrero ................. | A01K 73/12 43/100 |
| 10,959,416 | B2 * | 3/2021 | Bajer ..................... | A01K 75/00 |
| 2021/0400937 | A1 * | 12/2021 | Bajer ..................... | A01K 71/00 |

* cited by examiner

*Primary Examiner* — Jessica B Wong
(74) *Attorney, Agent, or Firm* — PV IP PC; Ude Lu; Wei Te Chung

(57) ABSTRACT

A fishing device includes a net disposed in a body of water containing fishes. A plurality of posts, wherein each post further includes a stem, a bottom cross disposed at a lower portion of the stem; a cross bar disposed at a top end of the stem; and a cord. The stem is an upright elongated protrusion extending from under a bottom to above a surface of the body of water. The cord is slidably secured to the cross bar. A first end of the cord is secured to a weight. A second end of the cord is secured to the net. The fishing device includes a release mechanism. The release mechanism grabs a portion of the cord to hold the weight in a first position adjacent to the cross bar. A bait system is disposed at or adjacent to a center of the net.

20 Claims, 7 Drawing Sheets

FISHING DEVICES AND METHODS

CROSS REFERENCE TO RELATED APPLICATIONS

This application is a continuation of Ser. No. 16/250,231, filed Jan. 17, 2019, which claims the benefit of U.S. Provisional Application No. 62/725,988, filed Aug. 31, 2018. The contents of the aforementioned applications are incorporated herein in its entirety for all purposes.

FIELD OF THE DISCLOSURE

The present invention relates generally to fishing devices and methods of using the fishing devices. More particularly, the embodiments disclosed herein remove invasive fish species selectively and effectively en masse.

BACKGROUND

Invasive fish species are serious threat to the native ecosystem. Invasive fish species commonly lack predators and over populate. Invasive fish species compete with native fishes for food sources, causing the populations of native fishes to decline, which may cause further decline of other native species that feed on the native fishes endangering the entire native ecosystem.

For example, *Cyprinus carpio* (herein after "carp") is an invasive fish species in North America. Carp was introduced to North America in late 1800s from Europe. Due to its habit of rooting in the bottom of the lake while searching for food, the common carp uproots aquatic vegetation, disturbs bottom sediments, releases nutrients from sediments into water column and deteriorates water quality of the lakes. Carp is also one of the leading causes of biodiversity declines in the lakes of North America.

Carp needs to be removed from the lakes to preserve the natural habitat and improve water quality. Additionally, carp needs to be removed selectively, without harming native fish and impacting natural habitat. They also need to be removed effectively en masse to make carp management economically viable. The embodiments disclosed herein provide solutions to remove carp from the lakes selectively and effectively en masse.

Traditional solutions of removing carps use large commercial seine nets (often over 1,000 feet long) that are dragged along the bottom of the lake. These seine nets are not very selective. They capture both the carp and native fishes. The seine nets also disrupt the bottom of the lake, disrupt aquatic vegetation stands and disrupt habitat for native fishes. Also, the seine nets snag easily on debris on the bottom allowing the carp to escape and learn how to avoid such nets in the future. Also, a large number of people is required to operate these nets. Therefore, current solution of using seine nets is not effective and arguably causes some unintended harm to the native ecosystem.

This invention selectively attracts carp to an area using baits with high specificity (over 95% fish attracted are carp). The embodiments of the invention condition carp to aggregate in a certain area over a period of time. The embodiments remove the attracted carp in large quantity. The embodiments do not harm other fish species because they primarily attract carp and other species caught in those nets can be easily released. The device is stationary, not pulled across the lake, thus it can be easily used around obstacles on the bottom. Due to the design, the embodiments can be triggered by one person, or triggered automatically once certain conditions are met. Due to the unique design of the embodiments of the invention, the captured fish can be harvested en masse.

SUMMARY

The present invention relates generally to fishing devices and methods of using the fishing devices. More particularly, the embodiments disclosed herein remove invasive fish species selectively and effectively en masse.

According to one embodiment, a fishing device includes a net disposed in a body of water containing fishes. A plurality of posts, wherein each post further includes a stem, a bottom cross disposed at a lower portion of the stem, a cross bar disposed at a top end of the stem, and a cord. The stem is an upright elongated protrusion extending from under a bottom to above a surface of the body of water. The cord is slidably secured to the cross bar. A first end of the cord is secured to a weight. A second end of the cord is secured to the net. The fishing device includes a release mechanism. The release mechanism grabs a portion of the cord to hold the weight in a first position adjacent to the cross bar. A bait system is disposed at or adjacent to a center of the net.

According to one embodiment, a method includes setting up a fishing device in a baiting mode. The fishing device includes a net disposed in a body of water containing fishes. A plurality of posts, wherein each post further includes a stem, a bottom cross disposed at a lower portion of the stem, a cross bar disposed at a top end of the stem, and a cord. The stem is an upright elongated protrusion extending from under a bottom to above a surface of the body of water. The cord is slidably secured to the cross bar. A first end of the cord is secured to a weight. A second end of the cord is secured to the net. The fishing device includes a release mechanism. The release mechanism grabs a portion of the cord to hold the weight in the first position adjacent to the cross bar. A bait system is disposed at or adjacent to a center of the net.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

Similar reference numbers in the figures refer to similar features. The features shown in the figures are exemplary only and should not be construed as to limit the scope of the claims.

DETAILED DESCRIPTION

Figure 1:
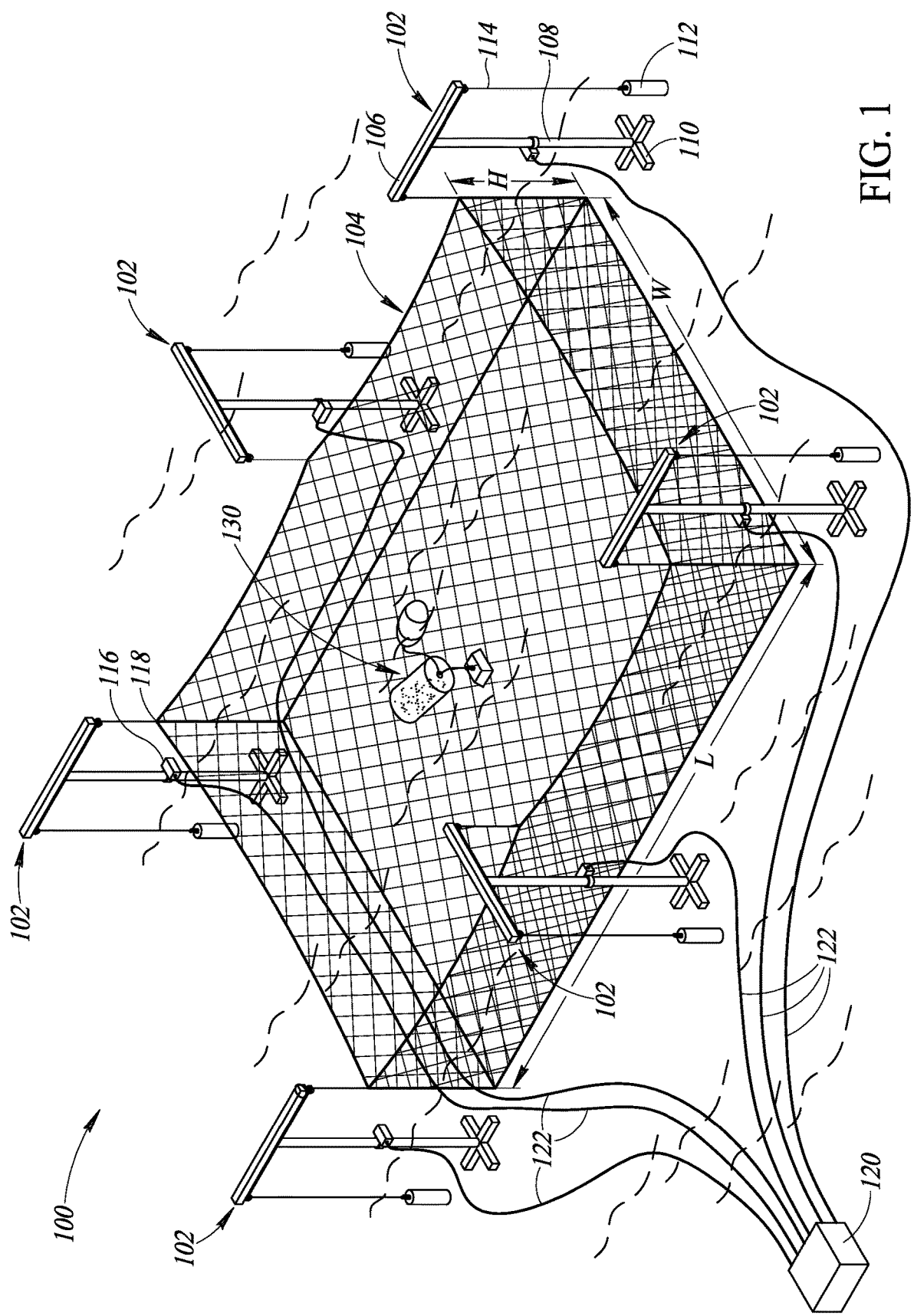
FIG. 1 shows a fishing device according to one embodiment of the disclosure.

FIG. 1 shows a fishing device 100 according to one embodiment of the disclosure. The fishing device includes a plurality of posts 102, a net 104, a bait system 130, and a rope holder 120.

The plurality of posts 102 act in synchronization. They are either in baiting mode or in harvest mode. FIG. 1 shows the posts 102 in harvest mode. Each post has a connection point 118 attached to the net 104. As shown in the embodiment of FIG. 1, the fishing device 100 includes six posts 102. In other embodiments, the fishing device 100 can include less or more than six posts 102.

As shown in FIG. 1, the net 104 is in a shape of a box with a horizontal bottom and four vertical sides. The net 104 has no top. The net 104 has a width (W), a length (L), and a height (H). In one embodiment, L is from 10 to 300 feet, preferably 50-120 feet. In one embodiment, the W is from 5 to 200 feet, preferably 20-60 feet. In one embodiment, the H is from 1 to 50 feet, preferably 8-15 feet.

As shown in FIG. 1, each of the top four corners and two middle points along the length of the net 104 are connection points 118. The connection points 118 are attached to the cords 114. In one embodiment, the fishing device 100 can operate with four posts. In another embodiment, the net can be in a triangle shape. When the net 104 is in a triangle, the fishing device 100 can operate with a minimum of three posts. In yet another embodiment, the net 104 can be in a circular or oval shape. When the net 104 is in a circular or oval shape, a plurality of posts may be used to operate the fishing device 100.

A post 102 includes a cross bar 106, a stem 108, a bottom cross 110, a weight 112, a cord 114, a release mechanism 116, and a release rope 122. The post 102 is inserted to a bottom of a lake, with the bottom cross 110 disposed near a top surface of the bottom of the lake. The stem 108 extends below the bottom cross 110 and is inserted into the soil at the bottom of the lake. The bottom cross 110 stabilizes the post 102 against tilting and/or sinking too deep into soft bottom.

The stem 102 is an upright-standing elongated protrusion that extends from the bottom of the lake up to 3 to 20 feet above the surface of the water. A cross bar 106 is attached to a top end of the stem 102. As shown in FIG. 1, the middle point of the cross bar 106 is connected to the top end of the stem 102.

The cross bar 106 includes hanging mechanisms, e.g., wheels, metal rings, or pulleys, that hang the weight 112 through the cord 114. The cord 114 has two ends. One end of the cord 114 is secured to the weight 112. Another end of the cord 114 is secured to the net 104 at the connection point 118. The hanging mechanism allows the cord 114 to slide. In one embodiment, the hanging mechanisms are two wheels attached at a lower side of the cross bar 106. In another embodiment, the cross bar 106 is a pipe with cavity inside, and the hanging mechanisms are two wheels installed inside of the cavity of the cross bar 106. In another embodiment, the cord slides through metal rings attached to each end of the cross bar 106. As shown in FIG. 1, the connection points 118 are disposed at the top edge of the net 104. In one embodiment, the weight 112 is a PVC pipe filled with concrete. In another embodiment, the weight 112 includes metal, e.g., plastic covered lead block. In another embodiment, the weight is a container filed with water.

Figure 2:
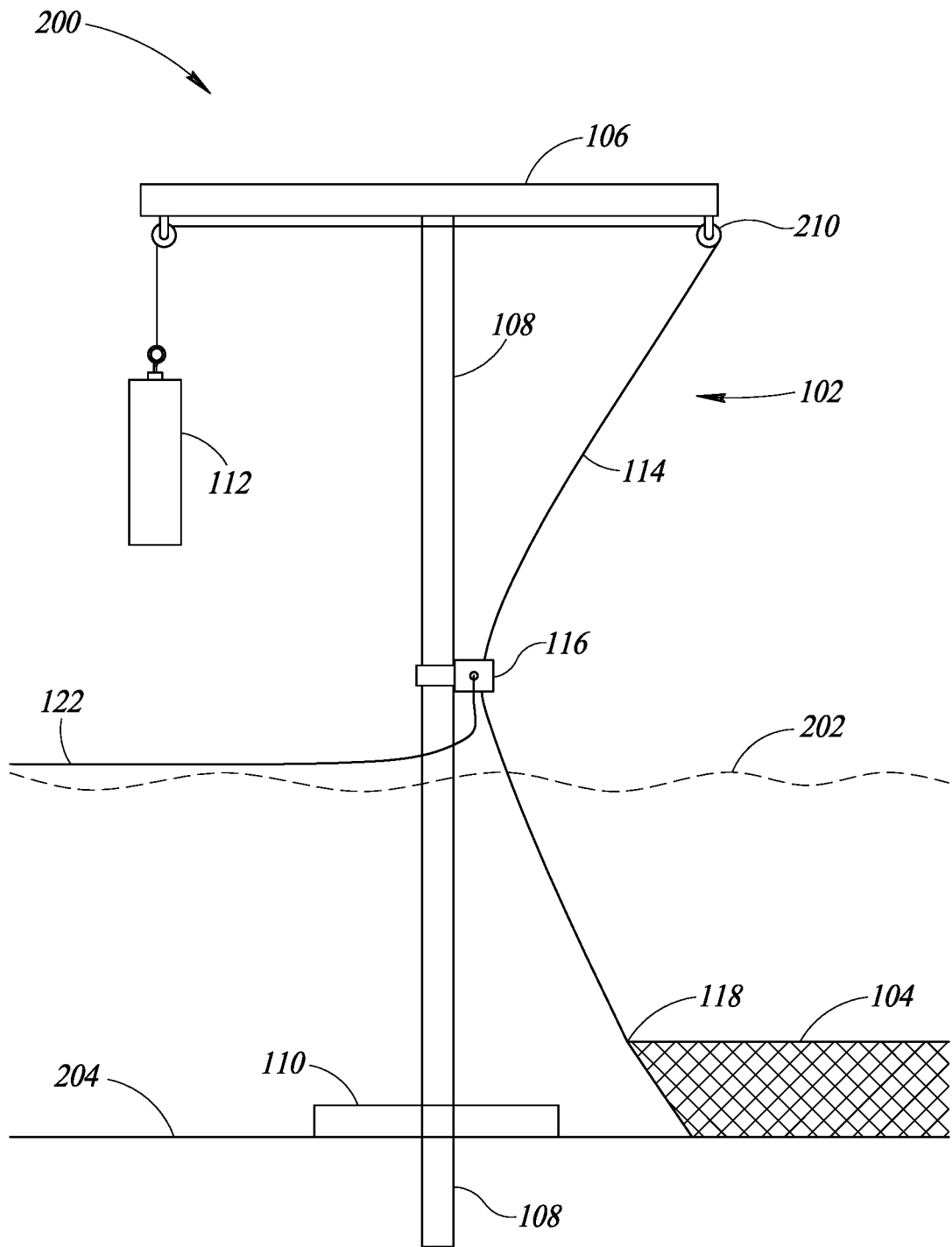
FIG. 2 shows a post in a baiting mode according to one embodiment of the disclosure.
Figure 3:
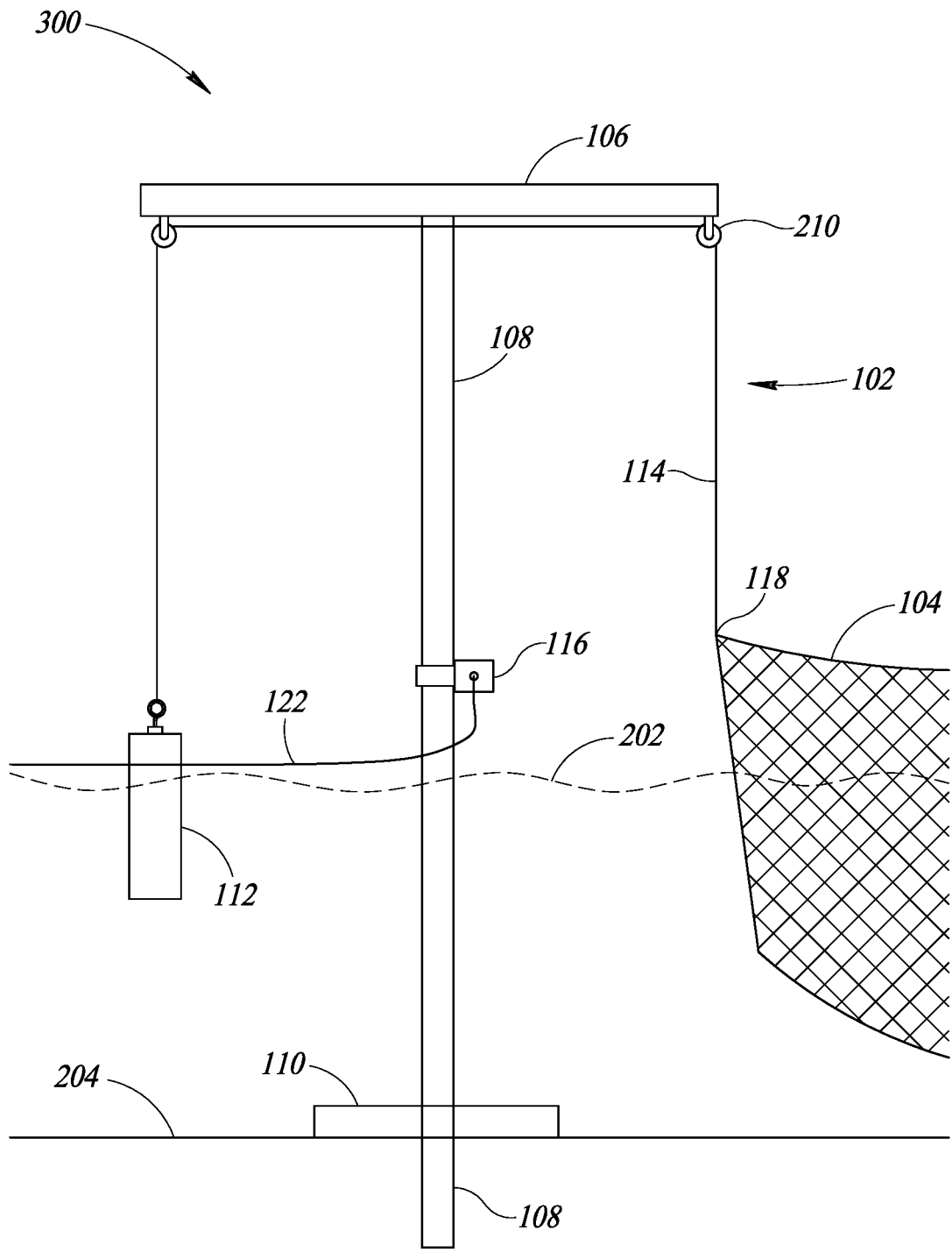
FIG. 3 shows a post in a harvest mode according to one embodiment of the disclosure.

The post 102 has two modes: baiting mode and harvest mode. In baiting mode, the weight 112 is hanged adjacent to the cross bar 106. The weight 112 is in a relatively higher position (a first position) in baiting mode compared to a position in harvest mode (a second position). FIG. 1 and FIG. 3 show the posts 102 in the harvest mode. FIG. 2 shows the post in a baiting mode. The weight 112 weighs between 10 and 200 pounds.

In baiting mode, a portion of the cord 114 is secured by the release mechanism 116, such that the weight 112 is held at the first position adjacent to the cross bar 106, and the net 104 is laid on the bottom of the lake. In one embodiment, to ensure the net 104 stays at the bottom of the lake, one or more lead ropes can be woven into the net 104.

To switch from the baiting mode to the harvest mode, the release mechanism 116 releases the cord 114, allowing the weight 112 to drop from the first position to the second position. While the weight 112 is dropping, the weight 112 pulls the net 104 up. In the harvest mode, the connection point 118 of the net is pulled above the water surface for 1 to 5 feet, in one embodiment.

The release mechanism 116 is caused to release the cord when an activator is triggered by pulling the release rope 122. In one embodiment, the activator is a lever disposed inside of the release mechanism 116. When the lever is pulled by the release rope 122, a cord grabber of the release mechanism 116 releases the cord 114, allowing the weight 112 to drop and pulling the net 104 up.

The release rope 122 is made of a buoyant material that floats on the surface of the water. The release rope 122 can be made with polypropylene or any other material that floats on top of water. One end of the release rope 122 is attached to the release mechanism 116. The other end of the release rope 122 is attached to the rope holder 120 that is located at least 20 feet away from the net 104. In one embodiment, a user can pull the release ropes 122 to release the weight 112 which in turn pulls up the net 104 into the harvest position. In another embodiment, the rope holder includes one or more motors that are able to pull the release ropes 122 automatically in response to command. In some embodiments, the rope holder 120 is located on shore. In other embodiments, the rope holder 120 is on the water.

In baiting mode, the net 104 lays at the bottom of the lake allowing the fishes, e.g., carps, to feed on the bait system 130. The bait system 130 is preferably disposed near or around the center of the net 104, maximizing the amount the fish to be captured. One or multiple baiting systems 130 can be used in each net 104. As the invasive species (e.g., carps) aggregate around the bait system 130, the release mechanism 116 can be triggered to release the cord 114, allowing the weight 112 to drop and simultaneously pull up the net 104 to harvest the fishes.

FIG. 2 shows a post 106 in a baiting mode 200 according to one embodiment of the disclosure. The post 102 includes a cross bar 106, a stem 108, a bottom cross 110, a weight 112, a cord 114, a release mechanism 116, and a release rope 122. The post 102 is inserted to a bottom of a lake, with the bottom cross 110 disposed near a top surface of the bottom of the lake 204. The stem 108 extends below the bottom cross 110 and is inserted into the soil at the bottom of the lake 204, acting as an anchor to stabilize the post 102. In some embodiments, the stem 108 extends 1-6 feet below the bottom cross 110. The bottom cross 110 includes four arms extending from the stem 108 horizontally. In some embodiments, each arm of the bottom cross 110 is in a range of 0.5 to 5 feet.

The stem 102 is an upright-standing elongated protrusion that extends from below the bottom of the lake up to 3 to 25 feet above the surface of the water 202. A cross bar 106 is attached to a top end of the stem 102. In another embodiment, the cross bar 106 can be installed below the top end of the stem 102. In one embodiment, the cross bar 106 is installed at or above the surface of the water and below the top end of the stem 102. In another embodiment, the cross bar 106 is installed at or below the water. In one embodiment, the stem 102 is a standalone upright protruding structure that extends from below the bottom of the lake up to 0 to 25 feet above the water surface, wherein the stem 102 is installed away from the shore and is not installed on a concrete block or the like. In one embodiment, the stem 102 is a standalone upright protruding structure that extends from below the bottom of the lake up above the water surface, wherein the stem 102 is not installed on a boat.

In baiting mode 200, the weight 112 is hanged adjacent to the cross bar 106. The weight 112 is in a relatively higher position (a first position, see FIG. 2) in baiting mode 200 compared to a position in harvest mode 300 (a second position, see FIG. 3). In baiting mode 200, a portion of the cord 114 is secured by the release mechanism 116, such that the weight 112 is hanged at the first position adjacent to the cross bar 106, and the net 104 is laid flat at the bottom of the lake 204. Because the net 104 is laid flat at the bottom of the lake 204, the fish can freely access the bait system 130 located near the center of the net 104. This allows the fishes intended to be removed to aggregate around the bait system 130 without the net 104 being an obstacle. In one embodiment, to ensure the net 104 stays at the bottom of the lake, one or more lead ropes can be woven into the net 104 to increase the heaviness of the net 104.

To switch from the baiting mode 200 to the harvest mode 300, the release mechanism 116 releases the cord 114, allowing the weight 112 to drop from the first position (higher position) to the second position (lower position). While the weight 112 is dropping, the sides of the net 104 are being pulled up encircling the fishes intended to be removed within the net 104.

The release mechanism 116 is caused to release the cord 114 when an activator of the release mechanism 116 is triggered. In one embodiment, the activator of the release mechanism 116 is triggered by pulling the release rope 122. In one embodiment, the activator is a lever disposed inside of the release mechanism 116. When the activator is triggered, a cord grabber of the release mechanism releases the cord 114, allowing the weight 112 to drop in position and pulling the side walls of the net 104 up. In one embodiment, the cord grabber is a jaw like mechanism, see 420 of FIG. 4. In one embodiment, the cord grabber can be programmed to release the cord at a predetermined time. For example, the cord grabber may include a timer. The timer can be programmed to trigger a release of the cord grabber after a certain predetermined period.

The release rope 122 is made of a buoyant material that floats on the surface of the water. The release rope 122 can be made with polypropylene or any other material that floats on top of water. One end of the release rope 122 is attached to the release mechanism 116. The other end of the release rope 122 is attached to the rope holder 120 that is located at least 20 feet away from the net 104. In one embodiment, a user can pull the release ropes 122 to release the weight 112 which, in turn, pulls up the net 104 to harvest the fishes. In another embodiment, the rope holder includes one or more motors that are able to pull the release ropes 122 automatically in response to a command transmitted with wire or wireless communication. In some embodiments, the rope holder 120 is located on the shore. In other embodiments, the rope holder 120 are on the water.

FIG. 3 shows a post 102 in a harvest mode 300 according to one embodiment of the disclosure. The post 102 includes a cross bar 106, a stem 108, a bottom cross 110, a weight 112, a cord 114, a release mechanism 116, and a release rope 122. The post 102 is inserted to a bottom of a lake, with the bottom cross 110 disposed near a top surface of the bottom of the lake 204. The stem 108 extends below the bottom cross 110 and is inserted into the soil at the bottom of the lake 204. The cross 110 acts as a stabilizer for the stem 108 preventing it from tilting or toppling over. In some embodiments, 1 to 6 feet of the stem 108 extend below the bottom cross 110. The bottom cross 110 includes four arms extending from the stem 108 horizontally. In some embodiments, each arm of the bottom cross 110 is in a range of 0.5 to 5 feet. The stem 102 is an upright-standing elongated protrusion that extends from below the bottom of the lake up to 3 to 25 feet above the surface of the water 202. A cross bar 106 is attached to a top end of the stem 102. In one embodiment, the stem 102 is installed to the natural bottom of the lake. In another embodiment, the stem 102 is installed on a footing, e.g., a piece of concrete block, that may be located off shore.

All features of the post 102 shown in FIG. 3 are similar to FIG. 2, except the cord 114 is being released by the release mechanism 116, the weight 112 is dropped to a second position (harvest mode) that is lower than the first position (baiting mode), and the net 104 is pulled up at or above the surface of the water 202.

To switch from the baiting mode 200 to the harvest mode 300, the release mechanism 116 releases the cord 114, allowing the weight 112 to drop from the first position to the second position. While the weight 112 is dropping, the sides of the net 104 is pulled up, encircling the fishes intended to be removed within the net 104. In the harvest mode 300, the connection point 118 of the net is pulled above the water surface 202. In some embodiments, the connection points 118 are pulled 0 to 10 feet above the water surface 202.

Figure 4:
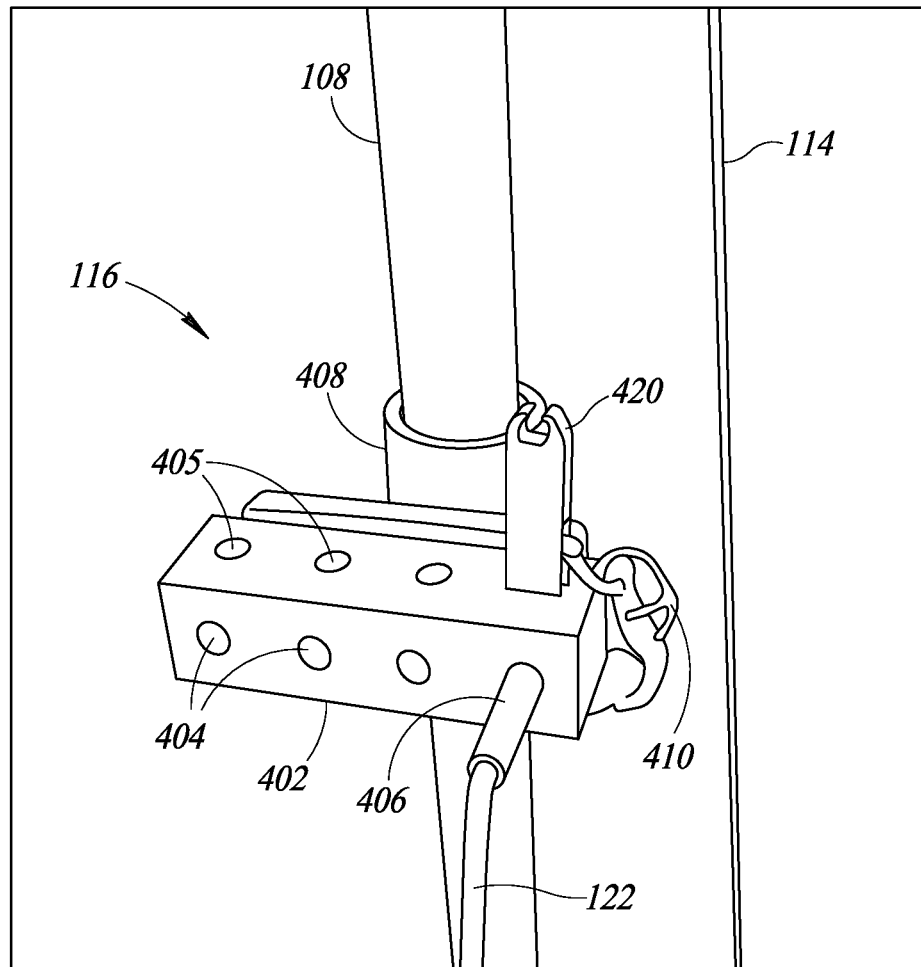
FIG. 4 shows a release mechanism according to one embodiment of the disclosure.

FIG. 4 shows a release mechanism 116 according to one embodiment of the disclosure. The release mechanism 116 is a device that releasably holds the cord 114 such that the weight 112 is maintained at a position adjacent to a top portion of the post 102.

The release mechanism 116 is secured to the stem 108 of the post 102 with an attachment mean 408. Any appropriate attachment mean can be used, for example, screws, metal bracket, metal clamps, joist, or the like. The release mechanism 116 includes a housing 402. The housing 402 includes a plurality of release rope seats 404 and grabber seats 405. As shown in FIG. 4, the housing 402 includes four release rope seats 404 on one surface of the housing 402. The housing 402 includes four grabber seats 405 on another surface of the housing 402.

The release mechanism 116 includes an activator 410 and a cord grabber 420. The release rope 122 is connected to the activator 410. When the release rope 122 is being pulled, the activator 410 is triggered to cause the cord grabber 420 to release the cord 114.

In the embodiment of FIG. 4, the activator 410 is a lever and the cord grabber 420 is a jaw. In baiting mode, the jaw 420 holds a slip knot formed with a portion of the cord 114. When the release robe 122 is being pulled, the lever 410 is triggered to cause the jaw 420 to open, releasing the cord 114. The weight 112 starts to drop from the first position to the second position. In the process of dropping the weight 112, the weight 122 pulls the cord 114 and untie the slip knot automatically allowing the cord 114 to slide through the hanging mechanism 210 attached to the cross bar 106. Thus, the release of the cord 114 by the release mechanism 116 switches the posts 102 from the baiting mode 200 to the harvest mode 300.

As shown in FIG. 1, the release mechanism 116 further includes a connector 406. The connector 406 secures the connection between the release rope 122 and the activator 410, such that the activator 410 is not accidentally triggered by unintended forces, e.g., winds, waves, fishes, etc.

Figure 5A:
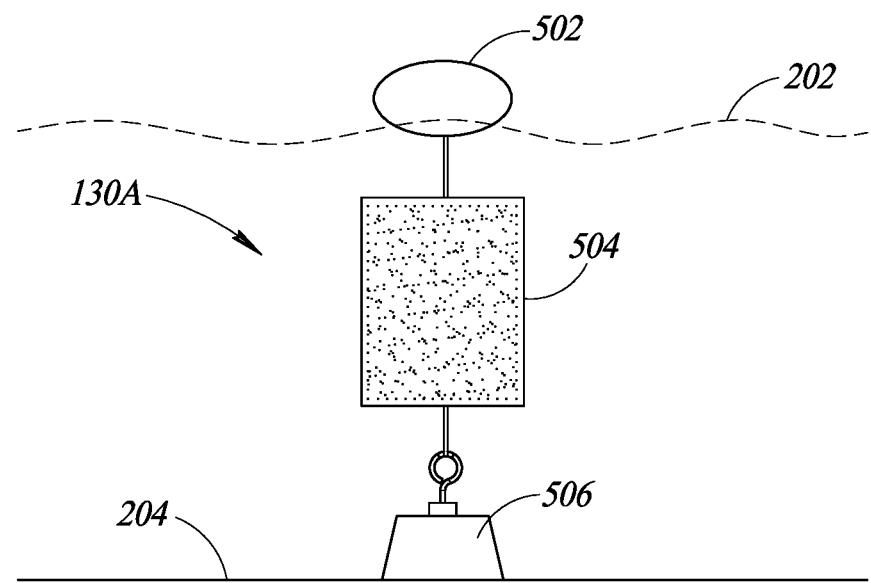
FIG. 5A shows a bait system according to one embodiment of the disclosure.

FIG. 5A shows a bait system 130A according to one embodiment of the disclosure. The bait system 130A includes a float 502, a bait bag 504, and an anchor 506. The float 502 floats on top of a water surface 202. The float 502 indicates where the bait system 130A is located.

The bait bag 504 is a container that contains the bait and allows the fish to feed from it. In one embodiment, the bait bag 504 is a made with mesh. The mesh of the bait bag 504 has openings 5% to 50% smaller in diameter than the bait particle. The mesh material is somewhat elastic such that the fish can suck the bait out of the bait bag through the opening of the mesh. When fishes are not feeding on the bait, the bait stays inside of the bait bag 504 because the mesh opening of the bait bag 504 is smaller than the bait particle. In one embodiment, the bait is crushed corns with a particle diameter of 0.1-0.5 cm. In another embodiment, the bait is whole corn kernel with a particle diameter of 0.5-1.5 cm. In one embodiment, the bait bag 504 may contain 30 to 100 pounds of bait.

In one embodiment, the bait bag 504 can include two or more mesh bags overlapping with each other to slow down the consumption rate of the fish. Slowing down the bait consumption speed can retain the fishes longer within the net 104.

The anchor 506 is attached to the bait bag and holds the bait bag 504 in place, such that the bait bag 504 stays inside the capture element. The anchor 506 weighs from 2 to 20 pounds.

Figure 5B:
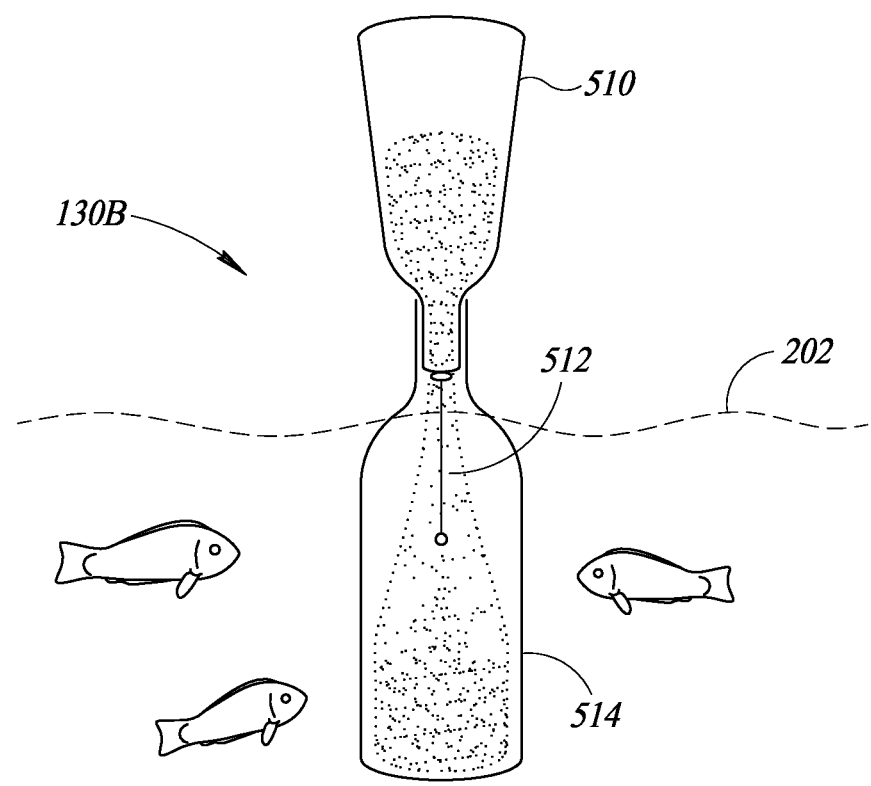
FIG. 5B shows a bait system according to one embodiment of the disclosure.

FIG. 5B shows a bait system 130B according to one embodiment of the disclosure. The bait system 130B has automatic on-demand feeder and/or bait-refill functionality. The bait system 130B includes a tank 510, a trigger rod 512, and a bait bag 514.

The bait bag 514 is the same or similar to the bait bag 504. The tank 510 is positioned higher than the bait bag 514. The bait system 130B may include a float assistance mechanism to maintain the tank 510 floating on top of the water surface 202 and maintain its up-right position as shown in FIG. 5B. The tank 510 includes a trigger rod 512. When the fishes are feeding out of the bait bag 514, the trigger rod 512 is inevitably touched by the fishes. When the trigger rod 512 is being moved around by the fishes, the bait contained in the tank 510 is released into the bait bag 514. Thus, the tank 510 automatically fills the bait bag 514 as the bait are being consumed. The tank 510 has the capacity to store an amount of bait at least equal or larger than the bait bag 514.

In one embodiment, the tank 510 has the capacity to store a first amount of bait. The bait bag 514 has the capacity to store a second amount of bait. The first amount is at least the same or larger than the second amount. In one embodiment, the first amount is 50-200 pounds, and the second amount is 50 pounds.

In one embodiment, the bait system 130B includes the tank 510 with the trigger rod 512, but not the bait bag 514. In this embodiment, the bait will be released directly into the water when the fishes touch the trigger rod 512. As such, the fishes can consume the bait directly without sucking the bait out of the bait bag 514.

Figure 6:
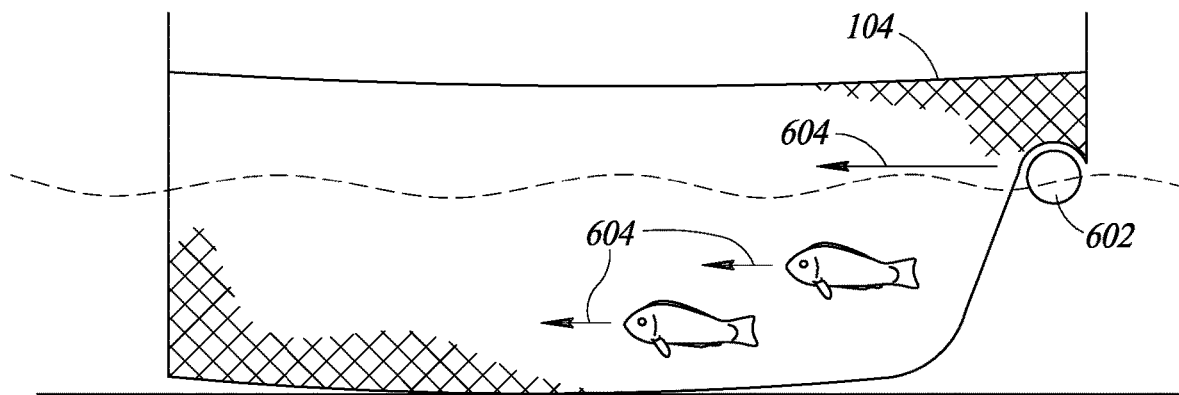
FIG. 6 shows a floating pipe that assists the harvesting according to one embodiment of the disclosure.

FIG. 6 shows a floating pipe 602 that assists the harvesting according to one embodiment of the disclosure. When harvesting the fishes, one or more floating pipes 602 can be used to assist the process of harvest. The floating pipe 602 is inserted underneath the net 104. A user of the fishing device 100 can push the floating pipe 602 in a direction 604. By pushing the floating pipe 602 in the direction 604, the fishes in the net 104 are also being pushed to the direction 604. In this way, the fishes in the net 104 are concentrated in a desired area, e.g., where the boat is, facilitating the process of harvesting the fishes.

In one embodiment, the floating pipe 602 is a PVC pipe capped at each end to achieve maximum buoyancy. In one embodiment, several capped PVC pipes are connected end-to-end using flexible joints which allow for flexibility of the floating pipe 602, which helps with aggregating fish in a desired area such as shown on FIG. 7.

After the weights 112 are dropped and the perimeter of the net 104 is raised above the water surface 202, the fishes are encircled within the net 104, i.e., the harvest mode. One or more floating pipes 602 are inserted under the bottom of the net 104. The floating pipes 602 raise the portion of the bottom of the net 104 in contact with the pipes 602 above the water surface. In one embodiment, the portion of the bottom of the net 104 in contact with the floating pipe 602 can be raised three feet or less above the water surface 202.

One or more users can then push the floating pipes 602 toward one corner or one side of the net 104 to concentrate the fishes, which allows harvesting the fishes en masse conveniently. In one embodiment, harvesting may occur by pulling or rolling the part of the net where the fish are aggregated onto a boat.

Figure 7:
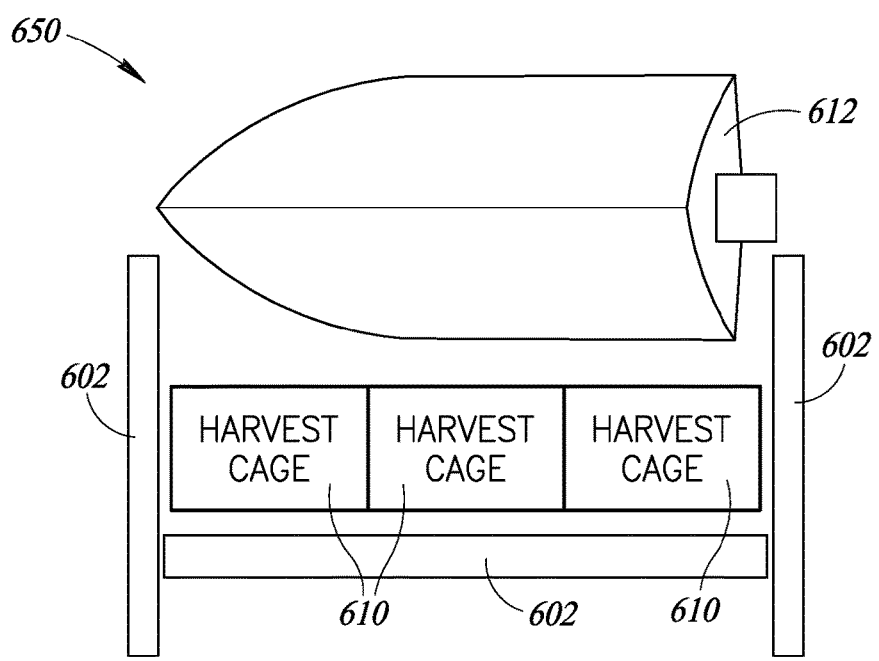
FIG. 7 shows an assembly of harvesting tools according to one embodiment of the disclosure.

FIG. 7 shows an assembly 650 of harvesting tools according to one embodiment of the disclosure. The assembly 650 includes a plurality of floating pipes 602 and a plurality of harvest cages 610, and at least one motorized boat 612.

As shown in FIG. 7, there are three floating pipes 602. In one embodiment, each of three users pushes one of the three floating pipes 602 toward a first side of the boat 612. A plurality of harvest cages 610 are pre-disposed at the first side of the boat 612. The cages 610 may include an open top, such that when the fishes are concentrated they easily fall into the cages 610. The motorized boat 612 may include one or more cranes to lift up the harvest cages 610 into the boat.

Figure 8:
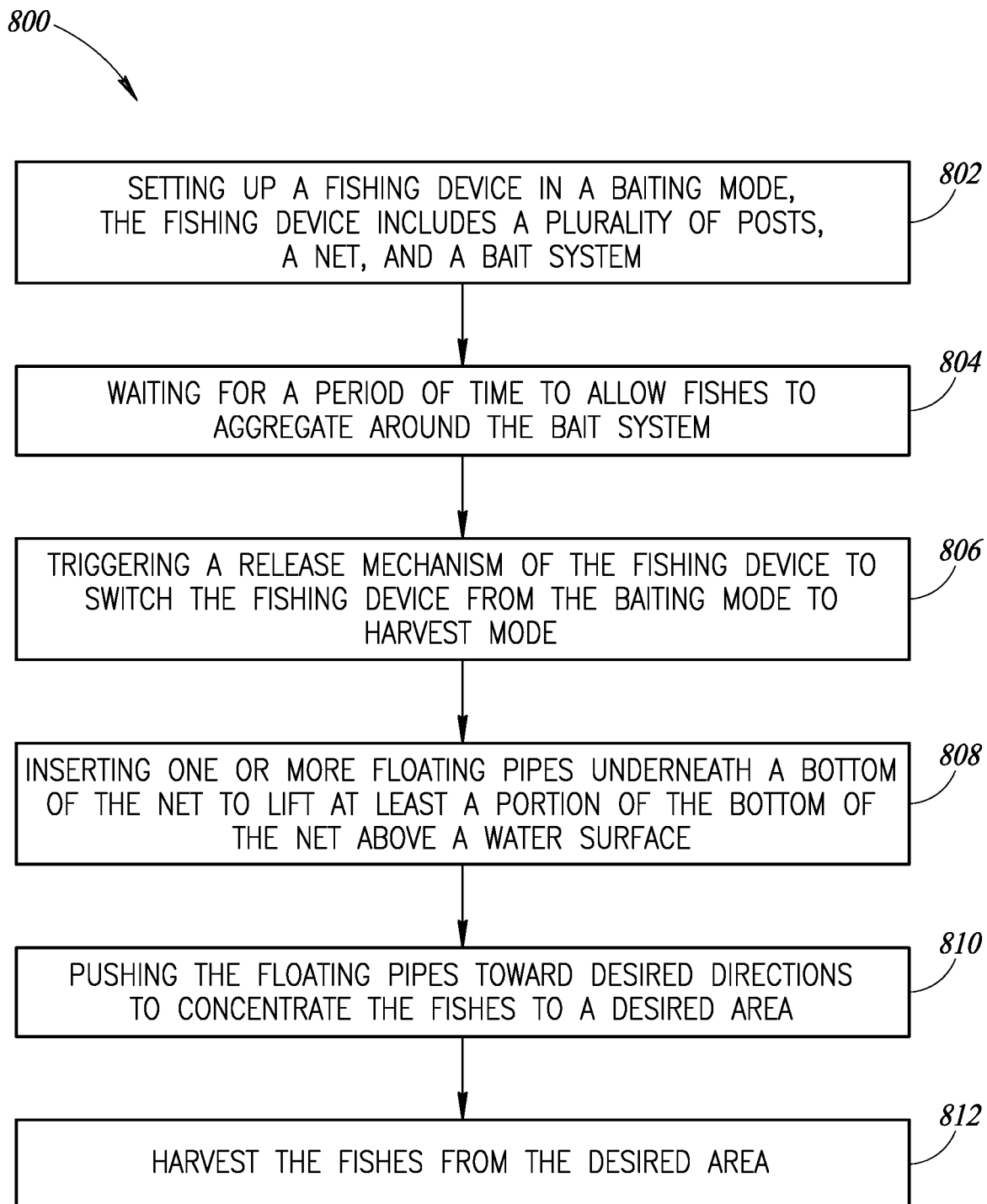
FIG. 8 is a method of using the fishing device according to one embodiment of the disclosure.

FIG. 8 is a method 800 of using the fishing device according to one embodiment of the disclosure. The method 800 includes a step 802 setting up a fishing device 100 in a baiting mode 200. The fishing device 100 includes a plurality of posts 102, a net 104, and a bait system 130.

The method 800 includes a step 804 waiting for a period of time to allow fishes to aggregate around the bait system 130. The waiting period can be from 1 hour to 20 days, preferably 3-5 days.

The method 800 includes a step 806 triggering a release mechanism of the fishing device 100 to switch the fishing device 100 from the baiting mode 200 to harvest mode 300. The method 800 includes a step 808 inserting one or more floating pipes 602 underneath the net 104 to lift at least a portion of a bottom of the net 104 above the water surface.

The method 800 further includes step 810 pushing the floating pipes toward desired directions to concentrate the fishes in a desired area. The method 800 includes step 812 harvesting the fishes from the desired area. In one embodiment, the desired area is adjacent to a boat. In another embodiment, the desired area is adjacent to a shore.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A fishing device, comprising
a net disposed in a body of water;
a post installed around a perimeter of the net, the post further including
a stem, a portion of the stem being above a surface of the body of water;
a cord, the cord being slidably secured to the stem, an end of the cord being attached to the net; and
a floating pipe, wherein,
during a baiting mode, the floating pipe is an independent structure not in contact with the net; and
during a harvest mode, the floating pipe being configured to contact underneath the net such that the floating pipe lifts at least a portion of a bottom of the net above the surface of the water.

2. The fishing device of claim 1, wherein the net is in a box shape without a top surface having a length, a width, and a height.

3. The fishing device of claim 2, wherein the length, width, and height are each more than 1 feet.

4. The fishing device of claim 1, wherein the post includes a bottom cross installed at a lower portion of the stem.

5. The fishing device of claim 4, wherein the bottom cross is disposed at a bottom surface of the body of water.

6. The fishing device of claim 1, wherein the fishing device includes a cross bar installed at an upper portion of the stem, the cord is slidably in contact with the cross bar.

7. The fishing device of claim 1, wherein the floating pipe includes plastic material.

8. The fishing device of claim 1, wherein the floating pipe includes two or more pipes connected end-to-end with flexible joints.

9. The fishing device of claim 1, wherein the floating pipe is capped at each end.

10. The fishing device of claim 1 further including a bait.

11. A method for fishing, comprising
disposing a net in a body of water;
installing a post near the net, a portion of a stem of the post being above a surface of the body of water;
slidably securing a cord to the post;
securing a portion of the net to an end of the cord; and
preparing, during a baiting mode, a floating pipe, the floating pipe being an independent structure not in contact with the net; and
slidably inserting, during a harvest mode, the floating pipe underneath the net such that the floating pipe lifts at least a portion of a bottom of the net above the surface of the water.

12. The method of claim 11, comprising
waiting for a period of time to allow fishes to aggregate near the net.

13. The method of claim 11, comprising
triggering a release mechanism to pull a portion of the net above the surface of the body of water.

14. The method of claim 11, comprising
dropping a weight from a first position to a second position, the weight being attached to an end of the cord, wherein the second position is lower than the first position.

15. The method of claim 11, comprising
pulling at least a portion of the net above the surface of the body of water.

16. The method of claim 11, comprising placing a bait in the net.

17. The method of claim 11, wherein the floating pipe includes two or more plastic pipes connected end-to-end with flexible joint.

18. The method of claim 17, comprising
pushing the one or more floating pipes to concentrate fishes to a desired area.

19. The method of claim 18, comprising
harvesting the fishes near or in the desired area.

20. The method of claim 18, wherein
disposing harvest cages near or in the desired area.

* * * * *